United States Patent Office 2,984,690
Patented May 16, 1961

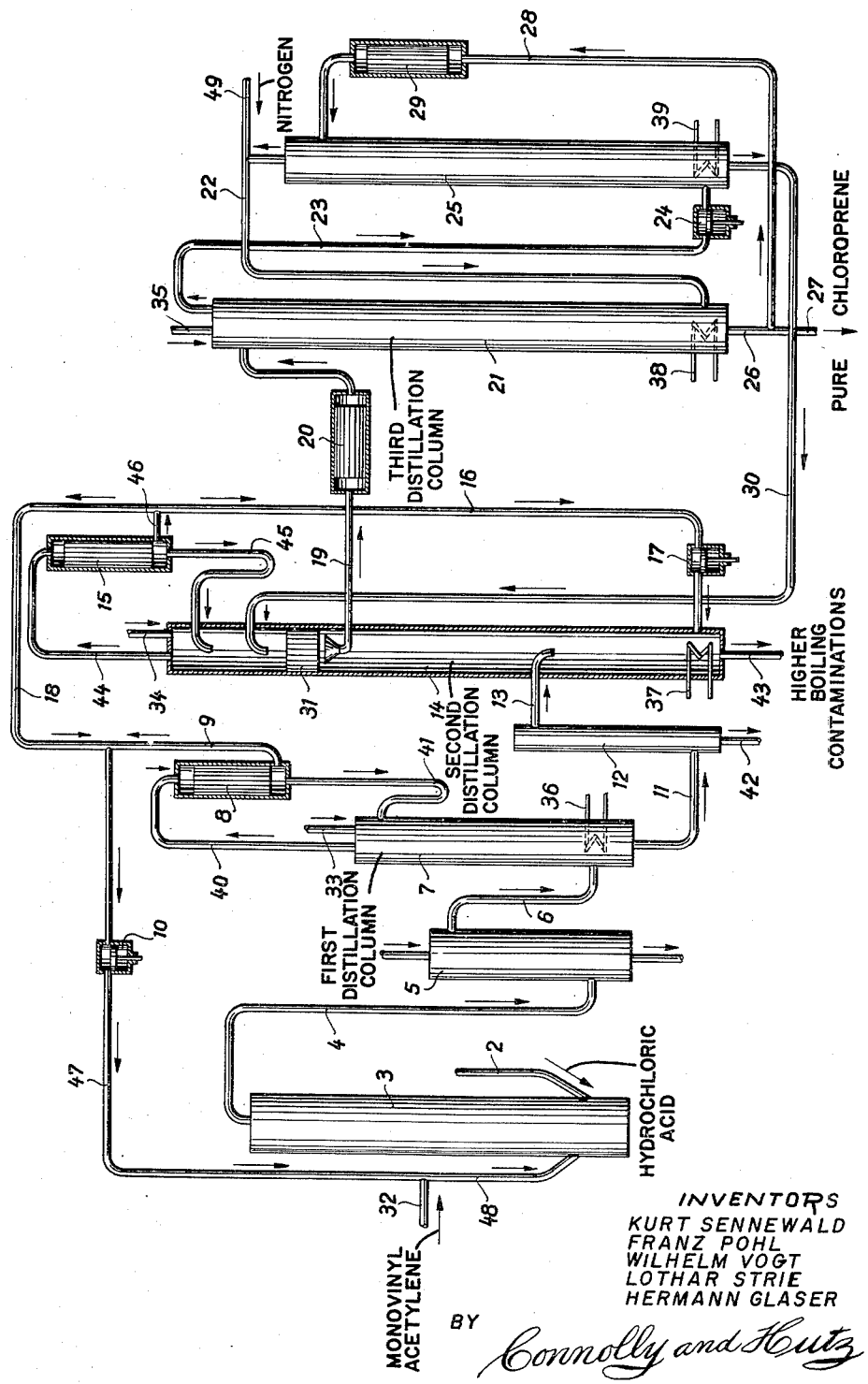

2,984,690

PROCESS FOR ISOLATING AND PURIFYING CHLOROPRENE

Kurt Sennewald, Franz Pohl, and Wilhelm Vogt, Knapsack, near Koln, Lothar Strie, Efferen, near Koln, and Hermann Glaser, Knapsack, near Koln, Germany, assignors to Knapsack-Griesheim Aktiengesellschaft, Knapsack, near Koln, Germany, a corporation of Germany Filed Dec. 3, 1958, Ser. No. 777,940

Claims priority, application Germany Dec. 7, 1957

7 Claims. (Cl. 260—655)

This is a continuation-in-part application of our application Serial No. 641,120, filed on February 19, 1957, now Patent No. 2,938,060.

The present invention relates to a process for the manufacture, isolation and purification of chloroprene.

U.S. Patent 2,938,060 relates to a process for isolating and purifying chloroprene wherein the gas mixtures containing chloroprene and monovinyl acetylene resulting from the reaction of monovinyl acetylene and hydrogen chloride known in itself are deacidified by washing them with water, dried and separated under atmospheric or slightly superatomopheric pressure, by rectifying distillations, while preventing penetration of atmospheric oxygen. A strong gas current is maintained in the distillation stages with partial condensation and polymerization inhibitors used in order to stabilize the liquid phases of the distillation.

By the aforesaid rectifying distillations, the chloroprene is first separated from the constituents having a higher boiling point than the chloroprene by driving off with a monovinyl acetylene gas current. The monovinyl acetylene is then separated from the chloroprene by expulsion with the aid of a current of inert oxygen-free gases, especially nitrogen, both gases being conducted in a cycle. The inert gas current which is charged with monovinyl acetylene and conducted in a cycle is freed from the monovinyl acetylene by washing with solvents under pressure and, if desired, at low temperatures, the monovinyl acetylene being recovered from the solvent by boiling out and the monovinyl acetylene being then returned to the cycle. As solvent for the extraction of the monovinyl acetylene from the inert gas current, chloroprene is advantageously used. The mixture of chloroprene and monovinyl acetylene is then returned to the separating unit.

In detail, the process of the aforesaid patent application can be carried out as follows:

The technical gas mixture containing chloroprene and monovinyl acetylene resulting from the reaction of monovinyl acetylene and hydrogen chloride in contact solutions is deacidified by washing it with water and the gas mixture, which contains in addition to unreacted monovinyl acetylene about 2% to about 25% by volume of chloroprene and about 0.1% to about 5% by volume of higher boiling impurities resulting from the reaction, is then submitted to a rectifying distillation in which the mixture is separated into higher boiling constituents, pure monovinyl acetylene and chloroprene which is saturated with monovinyl acetylene and from which the monovinyl acetylene is subsequently eliminated by distillation. The percentages by volume are calculated on the total volume of monovinyl acetylene, chloroprene and higher boiling constituents. In the distillation stages with partial condensation, an additional gas current of at least one inert gas is maitnained which promotes the respective driving off. The additional inert gas currents which are added to the distillation stages are advantageously conducted in a cycle. Monovinyl acetylene is used as gas current in the distillation stages for separating the chloroprene from the higher boiling impurities and nitrogen is used as inert gas for the subsequent elimination of the monovinyl acetylene from the chloroprene.

The process is carried out, for example, in a manner such that the gas mixture containing, in addition to unreacted monovinyl acetylene, chloroprene and higher boiling impurities resulting from the reaction, such as dichlorobutene, chloroprene oils or methylvinyl ketone, is conducted to a first distillation stage where the higher boiling impurities obtained in the sump are separated and the pure gas mixture containing chloroprene and monovinyl acetylene, which mixture leaves at the head of the first distillation stage, is conducted to a second distillation stage from which monovinyl acetylene is taken off at the head and reconducted in a cycle to the reaction. In the sump of the second stage, chloroprene is obtained which is saturated with monovinyl acetylene and which after cooling to a temperature between about 0° and about +40° C. is conducted to a third distillation stage in which the monovinyl acetylene is blown off at the head by means of a gas current of at least one inert gas such as nitrogen, carbon monoxide, carbon dioxide, hydrogen, methane, argon or helium, while in the sump of the third stage pure chloroprene is obtained as final product. The mixture of monovinyl acetylene and inert gas taken off at the head of the third stage and consisting of about 1 part by volume of monovinyl acetylene for 2 to 50 parts by volume of inert gas is subsequently conducted in counter-current to a washing liquid consisting of at least one substance such as chloroprene, acetone or methanol or of oils of compounds having an aromatic carbon skeleton. The inert gas which has thus been freed from the monovinyl acetylene is then reconducted in a little cycle to the sump of the third distillation stage.

In the first and second distillation stages, an additional gas current of monovinyl acetylene is maintained for driving off the chloroprene from the higher boiling impurities which gas current is first introduced into the sump of the first distillation stage. The quantity of the additional gas amounts to about 1–20 parts by volume calculated on 1 part by volume of chloroprene in the starting gas mixture. The amount of monovinyl acetylene from the starting gas mixture and the additional gas leaving together at the head of the second stage is then decomposed in such a manner that the amount of additional gas is cycled and the excess of monovinyl acetylene is reconducted into the preceding reaction of monovinyl acetylene and hydrogen chloride in contact solutions.

The starting gas mixture which has been washed with water and/or the additional gas consisting of monovinyl acetylene may be dried with calcium chloride prior to reconducting it, or them, into the first distillation stage.

In the distillation stages with partial condensation, pressures between about 1 and about 5 absolute atmospheres and temperatures between about −20° C. and about +60° C. are maintained, whereas in the following stage for washing out the monovinyl acetylene from the inert gas pressures between about 1 and about 50 absolute atmospheres and temperatures between about −40° C. and about +20° C. are maintained. It is advantageous to maintain in the about three distillation stages with partial condensation pressures between about 1.02 atmospheres (0.02 atmosphere gage) and about 2 atmospheres (1 atmosphere gage) and temperatures between about −10° C. and about +50° C., whereas in the following stage for washing out the monovinyl acetylene from the inert gas, pressures between about 1.05 atmospheres (0.05 atmosphere gage) and about 10 atmospheres (9 atmospheres gage) and temperatures between −30° and 0° C. are maintained.

The ratio of the volume of the portion of chloroprene in the starting gas mixture to the volume of the monovinyl acetylene which is introduced as additional gas into the sump of the first distillation stage varies between about 1:5 and about 1:10. For stabilizing the liquid phases, at least one substance prohibiting polymerization is added to the distillation stages. This polymerization inhibitor may be added at the head of each of the about three distillation stages. As such inhibitors, saturated solutions of phenothiazine in chloroprene may be injected into the distillation stages.

The monovinyl acetylene is recovered by boiling out from the washing liquid which is used for washing out the inert gas current charged with monovinyl acetylene and conducted in the smaller cycle whereupon the monovinyl acetylene is reconducted into the large starting cycle. After having washed out the monovinyl acetylene of the inert gas current conducted in the smaller cycle, said gas current is washed out with water, in order to eliminate the washing liquid carried over, and dried. Only then is it reconducted into the third distillation stage. It is advantageous to use chloroprene as washing liquid for washing out the inert gas current conducted in the smaller cycle and charged with monovinyl acetylene which chloroprene is taken from the pure chloroprene obtained in the sump of the third distillation stage as final product and which is used at a temperature corresponding to the washing process. The mixture of chloroprene and monovinyl acetylene obtained in the subsequent washing out is added to the mixture of chloroprene and monovinyl acetylene introduced into the first distillation stage. In this manner, the pure chloroprene obtained in the sump of the third distillation stage can be partially used, after being cooled to the temperature corresponding to the subsequent washing for washing out the inert gas current charged with monovinyl acetylene.

To the monovinyl acetylene conducted in the large cycle, there may be advantageously added between about 15% by volume and about 60% by volume of at least one inert diluting gas such as nitrogen or n-butane, the percentage by volume being calculated upon the sum of monovinyl acetylene and diluent gas. To the monovinyl acetylene conducted in the large cycle there may be added, for example, between about 50% by volume and about 60% by volume of nitrogen, the percentage by volume being calculated upon the sum of monovinyl acetylene and nitrogen, or there may be added to said monovinyl acetylene between about 35% by volume and about 40% by volume of n-butane, the percentage by volume being calculated upon the sum of monovinyl acetylene and n-butane. The ratio of the volume of monovinyl acetylene and n-butane which, dissolved in the chloroprene, both reach the third distillation stage to the volume of the inert gas conducted in the little cycle in the third distillation stage varies between about 1:2 and about 1:50. This ratio still exists at the moment when the mixture of monovinyl acetylene and n-butane is conducted to the washing out from the inert gas. Finally, it is also possible to add to the monovinyl acetylene conducted in the large cycle between about 35 and about 40% by volume of technical n-butane, the percentage by volume being calculated on the sum of monovinyl acetylene and technical n-butane in which case the technical n-butane may contain as impurities up to 30% by volume of at least one aliphatic hydrocarbon such as butylene, propane, isobutane, isopentane or n-pentane, the percentage by volume being calculated on the sum of n-butane and impurities, and the mixing ratio of the hydrocarbons including the n-butane being such that the boiling point and the vapor pressure of the n-butane are not essentially changed.

Now, we have found that according to an advantageous modification of the process of the aforesaid patent application, only the monovinyl acetylene portion contained in the starting gas mixture which results from the reaction and is conducted to the distillation is separated in a first distillation stage from the chloroprene and the impurities which are obtained as sump saturated with dissolved monovinyl acetylene. In the second distillation stage, the chloroprene is then separated from the impurities by means of a gas current from a little additional cycle of monovinyl acetylene. In the third distillation stage, the monovinyl acetylene which is still dissolved in the chloroprene coming from the second distillation stage is driven off by means of an oxygen-free inert gas current which is conducted in a cycle.

The excess amount of starting monovinyl acetylene leaving at the head of the first distillation stage is recycled to the reaction carried out with hydrogen chloride in aqueous cuprous chloride solutions in the reactor. Only in the second distillation stage is the chloroprene separated from the impurities by means of a gas current from a little additional cycle of monovinyl acetylene. The impurities are obtained as sump, while the starting gas mixture which has been freed from the main quantity of monovinyl acetylene is introduced into this distillation stage at about one-third of the height of the column and chloroprene saturated with monovinyl acetylene is taken off at about two-thirds of the height of the column as a mixture consisting, for example, of about 70% of chloroprene and about 30% of monovinyl acetylene. At the head of this distillation stage, about that portion of pure monovinyl acetylene which merely flows as expulsion gas in the little cycle of the second distillation stage, leaves together with the portion of monovinyl acetylene which has been introduced in the dissolved state with impurities and the chloroprene.

The monovinyl acetylene leaving at the head of the second distillation stage is split in a manner such that the quantity of expulsion gas flowing in the little cycle returns to the sump of this second distillation stage, while the quantity of monovinyl acetylene which has been introduced into the second distillation stage in the dissolved state together with the impurities and the chloroprene is branched off and recycled in the large cycle to the reaction in the reactor, after having been combined with the head product of the first distillation stage.

In the following third distillation stage, the monovinyl acetylene which is still dissolved in the chloroprene taken off from the second distillation stage is expelled by a cycled oxygen-free current of inert gas. The mixture of chloroprene and monovinyl acetylene resulting from the washing process of the oxygen-free inert gas taking place after the third distillation stage with the use of chloroprene as washing liquid is returned to the second distillation stage.

According to this mode of proceeding, there is recovered at the head of the first distillation stage only the excess of starting monovinyl acetylene, and at the head of the second distillation stage there is recovered separately in the first place the monovinyl acetylene cycled as expulsion gas; whereas according to the flow scheme of the above mentioned patent application, these gaseous monovinyl acetylene yields are drawn off together at the head of the second distillation stage and have then to be split into the desired proportions.

The process of the present invention offers the advantage that it renders it possible to proceed in the wet way in the cycle of the first distillation stage and that a drying of the liquid takes place only between the first and second distillation stage; whereas according to the flow scheme of the above mentioned patent application the reaction gases are already subjected to a total drying after the water wash before the first distillation stage. Furthermore, according to said patent application, a reflux ratio of 1:1½ to 1:2 was necessary for washing out the methyl-vinyl ketone in the first distillation stage, whereas the process of the present invention permits of a reflux ratio of 1:1½ in the first distillation stage and only the second distillation stage still requires a reflux ratio of 1:1½ to 1:2. The flow scheme of the present invention thus allows of an energetically much more favorable operation.

Contrary to the flow scheme of the aforesaid patent application, it is not necessary, according to the present invention, to conduct the mixture of chloroprene and monovinyl acetylene resulting from the washing process of the inert gas after the third distillation stage to the first distillation stage but said mixture may also be directly introduced into the second distillation stage.

The substantial and common characteristic of every possible flow scheme according to the invention is the fact that in the distilling columns, an additional intense gas current is maintained preferably under at least slightly elevated pressure and that in the separation of chloroprene from the higher boiling impurities monovinyl acetylene is used as gas current and that for separating the chloroprene from the lower boiling monovinyl acetylene nitrogen or any other inert gas is used. It is furthermore appropriate to free for example the nitrogen from monovinyl acetylene by washing with solvents such as acetone or as described preferably with chloroprene at elevated pressure and suitably at low temperatures whereby the amounts of solvents required for washing out can be strongly reduced. The application of higher pressures in the washing process of the monovinyl acetylene described is rendered possible by the strong dilution of the monovinyl acetylene, for example with nitrogen and also at low temperatures since the spontaneous decomposition of monovinyl acetylene is avoided by diluting it with inert gases and by operating at low temperatures.

Finally, it must be emphasized that according to the process of the present invention the chloroprene is not only isolated in the form of the crude product and obtained while avoiding polymerization but it is simultaneously purified and obtained in a very pure form in the sump of the last distillation stage.

Furthermore the numerous cycling currents of the individual gas portions are characteristics of the process of the invention. First the unreacted monovinyl-acetylene flowing off the reactor, which current according to the flow scheme is taken off at the head of the second or the first distillation stage, is conducted in a cycle and reconducted into the reactor. Dissolved in chloroprene, it only partially reaches the third distillation stage and from there, subsequent to its expulsion, the washing tower from which it is reconducted in a cycle for example again dissolved in chloroprene, into the first or second distillation stage. The second cycle consists of a nearly constant amount of monovinyl acetylene used as additional expulsion gas for separating the chloroprene from the higher boiling impurities and which cycle, according to the flow scheme of the aforesaid patent application, comprises the first and the second distillation stage. According to the present invention, however, it may pass, for example, only the second distillation stage, as already described above, whereas at the head of the first stage only the unreacted starting monovinyl acetylene is drawn off. The third cycle finally consists of an inert gas such as nitrogen, which is used for expelling the residual monovinyl acetylene from the chloroprene in the third and generally last distillation stage. Said gas is conducted in a cycle via the third distillation stage and the adjacent washing tower.

Of course, a dilution gas such as for example n-butane added to the monovinyl acetylene for desensitizing purposes joins the cycling currents of monovinyl acetylene. When proceeding according to the above mentioned patent application, care had to be taken that in case nitrogen was used as diluent gas instead of n-butane, the nitrogen did not penetrate by way of the siphon into the third distillation stage since unlike n-butane it is not soluble in monovinyl acetylene. In this case, the cycle of dilution gas consisting of nitrogen was separated from the inert gas cycle of nitrogen in the third distillation stage with the aid of the siphon.

In the case when n-butane is used as diluent gas, it is introduced proportionally with the monovinyl acetylene dissolved in chloroprene by way of the siphon into the third distillation stage. From there it moves to the washing tower and after the washing it returns to the separating unit together with the monovinyl acetylene dissolved in chloroprene as washing liquid.

In the process of the present invention, n-butane is advantageously used as diluent gas since a cycle of dilution gas consisting of nitrogen would comprise only the first distillation stage. The second distillation stage would operate without dilution and only in the third distillation stage would the cycle of inert gas consisting of nitrogen again provide a dilution.

Into the unit only monovinyl acetylene and hydrogen chloride are introduced corresponding to the portions of the gases being reacted as well as inert gas to complete possible losses and at the head of the distillation stages substances inhibiting the polymerization. In addition to the higher boiling impurities resulting from the reaction and which are drawn off the sump of the first or second distillation stage according to the process, only pure chloroprene is taken off from the sump of the last, generally the third, distillation stage.

According to the above mentioned patent application, the drying tower for the gases conducted to the distillation was disposed after the reactor and the washing tower but before the first distillation column. In another form of the process of the invention, the drying tower may be advantageously disposed between the first and the second distillation stage so that the liquid starting mixture taken off from the sump of the first distillation stage is introduced into the second distillation stage by way of this drying tower. If instead of the gas the liquid is dried as described above, essentially smaller quantities of drying substance are needed, which constitutes a great advance over the process of the aforesaid patent application.

It should be emphasized that the drying towers may be dispensed with in any of the above mentioned cases. The water contained in the gases and/or the liquids is then separated only in the course of the following distillation.

According to a further conception of the present invention, the second distillation stage may advantageously consist of two parts, the first part extending to a position below the outlet for the chloroprene saturated with monovinyl acetylene and said outlet being now situated in the sump of the second part.

One method of operation according to the invention is described by way of example below, without, however, limiting the invention thereto, this method being illustrated in the accompanying drawing showing a flow diagram.

*Example*

After the addition of 5 nm.$^3$/h. (normal cubic metre at 0° C. and 1 atmosphere per hour) of fresh monovinyl acetylene via feed pipe 32, 65 nm.$^3$/h. of cycled monovinyl acetylene from pipe 47 are introduced under a pressure of 1.5 absolute atmospheres (0.5 atmosphere gage) through feed pipe 48 into the bottom of reactor 3 into which hydrogen chloride is introduced through feed pipe 2. The reaction gases leave reactor 3 at the head through outlet pipe 4; they consist of 16 kg./h. of chloroprene, 1.5 kg./h. of dichlorobutene and chloroprene oils, 0.1 kg./h. of methylvinyl ketone, 147 kg./h. of monovinyl acetylene and 9 kg./h. of water.

After being de-acidified in the following water wash 5, the reaction gases travel through feed pipe 6 into the first distilling column 7 provided with heating device 36. In column 7, the reaction products are separated by means of the reflux produced in condenser 8 which is inserted in outlet pipe 40 provided at the head of column 7, the product which leaves at the bottom of condenser 8 being returned through pipe 41 into column 7. In this distilling column 7, the reaction products are separated together with 5.9 kg./h. of monovinyl acetylene dissolved therein and 4.5 kg./h. of water forming the second phase. 142.1 kg./h. of monovinyl acetylene leave condenser 8 through outlet pipe 9 in a gaseous form. After the addition of 5.9 kg./h. of monovinyl acetylene via pipe 18, the monovinyl acetylene recycled through pipe 47 via water ring compressor 10 is returned together with 5 nm.³/h. of fresh monovinyl acetylene from feed pipe 32 to reactor 3. The temperature of the sump of the distillation column 7 is 25° C., the head temperature is 5° C. It may also be advantageous to dispose compressor 10 in pipe 40 provided at the head of column 7.

The sump product separated in column 7 and consisting of 16 kg./h. of chloroprene, 1.5 kg./h. of dichlorobutene and high boiling chloroprene oils, 0.1 kg./h. of methylvinyl ketone, 5.9 kg./h. of divinyl acetylene, 4.5 kg./h. of water, and comprising furthermore dissolved monovinyl acetylene flows through outlet pipe 11 into drying tower 12 filled with calcium chloride. At the bottom of tower 12, all the water separates and is drawn off through outlet pipe 42, while the organic phase moves slowly upwards through the solid calcium chloride and finally flows through feed pipe 13 into the second distillation column 14 which it enters at about one third of the height of the column.

In the lower part of column 14, the chloroprene and almost all the monovinyl acetylene dissolved therein are expelled from the reaction product introduced. In order to reduce the partial pressure and consequently the temperature, 85 kg./h. of gaseous monovinyl acetylene are introduced under a pressure of 0.25 atmosphere (gage) into the sump of column 14 by means of compressor 17. The temperature of said sump is kept at 65° C. by means of heating device 37. The chloroprene evaporated in the lower part of column 14 is retransformed into the liquid phase in the upper part of column 14 by means of a reflux produced in condenser 15 and consisting of monovinyl acetylene. A part of this liquid phase, i.e. 30 kg./h. of chloroprene together with 10 kg./h. of monovinyl acetylene, is drawn off at about two thirds of the height of the column through outlet pipe 19, while another part thereof forms a reflux which in the middle of column 14 liberates the chloroprene vapors moving in an upward direction from entrained methylvinyl ketone, dichlorobutene and chloroprene oils. Condenser 15 is connected with pipe 44 provided at the head of column 14. The product leaving at the bottom of condenser 15 is reconducted through return pipe 45 into column 14. From the sump of column 14, a mixture consisting of 1.5 kg./h. of dichlorobutene and chloroprene oils and 0.1 kg./h. of methylvinyl ketone and containing furthermore about 0.08 kg./h. of dissolved monovinyl acetylene can be drawn off through outlet pipe 43. 90.9 kg./h. of gaseous monovinyl acetylene leave condenser 15 through outlet pipe 46. Of this gaseous monovinyl acetylene, 85 kg./h. are sucked in through circuit conduit 16 by compressor 17 and return to column 14 as expulsion gas, while 5.9 kg./h. return through pipes 18 and 47 into the reaction cycle. The head temperature of column 14 is about 5° C.

The mixture of 30 kg./h. of chloroprene and 10 kg./h. of monovinyl acetylene which has been drawn off through pipe 19 and which has been freed from high boiling constituents is cooled in cooler 20 to a temperature within the range of −15° C. to −20° C. and introduced into the third distillation column 21 into the bottom of which 21 nm.³/h. of nitrogen are introduced as expulsion gas under a pressure of 0.15 atmosphere (gage) through conduit 22. The sump of column 21 is kept at a temperature of 12° to 14° C. by means of heating device 38, while the head temperature of the column is about −15° C. The nitrogen which has been introduced and which is charged with 10 kg./h. of monovinyl acetylene and 3 kg./h. of chloroprene leaves column 21 at the head through pipe 23. It is then compressed to 2.5 atmospheres (gage) (3.5 absolute atmospheres) by compressor 24 and introduced into the bottom of washing column 25 the head of which is sprayed with a current of 11.5 kg./h. of pure chloroprene which is introduced from the sump of column 21 through outlet pipe 26 and branch line 28 and after having been cooled to −30° C. in cooler 29 inserted in wash column 25. Of the chloroprene current leaving the third distillation column 21 through outlet pipe 26, 16 kg./h. of chloroprene are drawn off as pure final product through outlet 27.

In the sump of washing column 25 which sump is kept at a temperature of −18° C. by heat exchanger 39 charged with cooling brine, a mixture of 14 kg./h. of chloroprene and 10 kg./h. of monovinyl acetylene accumulate which is returned through outlet pipe 30 into the second distillation column 14. The latter is provided with a heating device 31 for the supply of the evaporation heat necessary for expelling the monovinyl acetylene from the chloroprene at outlet pipe 19 to such an extent that the content of monovinyl acetylene in the chloroprene is reduced to the concentration mentioned above. Pipe 22 for the cycled nitrogen is provided with a feed pipe 49 for the replacement of a possible loss of expulsion gas.

Distillation columns 7, 14 and 21 are provided at the heads with feed pipes 33, 34 and 35 for the introduction of substances prohibiting polymerization, for example saturated solutions of phenothiazine in chloroprene.

If it appears suitable or if it is desired for reasons of space, the second distillation column 14 may be divided into two parts. In this case, the first part extends from the sump to a position below the outlet pipe 19 and the second part extends from said outlet with heating device 31 to the head of the column. The reflux from the sump of the second part has then to be introduced through an additional pipe into the first part. The rest of the pipe system including, for example, a vapor pipe leading from the first to the second part of the column has to be adapted accordingly.

Obviously many modifications and variations of the present invention are possible in the light of the above teachings. It is, therefore, to be understood that within the scope of the appended claims the invention may be practiced otherwise than as specifically described.

We claim:
1. A process for manufacturing pure chloroprene which comprises reacting monovinylacetylene with hydrogen chloride in an initial reaction zone to obtain a starting gas mixture comprising chloroprene and monovinylacetylene wherein the chloroprene forms about 2 to 25% by volume of the mixture and wherein there are present in the mixture about 0.1 to 5% by volume of higher boiling impurities resulting from the reaction, said impurities comprising at least one substance selected from the group consisting of dichlorobutene, chloroprene oils and methylvinylketone, washing said gaseous mixture with water to de-acidify the mixture, separating in a first distillation stage the monovinylacetylene portion contained in the starting gas mixture which results from the reaction from the chloroprene and the higher boiling impurities, said chloroprene and said impurities being obtained as sump saturated with dissolved monovinylacetylene, separating the chloroprene from the higher boiling impurities in the second distillation stage by means of a gas current consisting of monovinylacetylene, expelling in a third distillation stage by means of a current of oxygen free inert gas the monovinylacetylene which is still dissolved in the chloroprene taken off from the second distillation stage, and maintaining a pressure of up to about 5 atmospheres during the distillation steps.

2. The process of claim 1 comprising the steps of collecting the impurities in the sump of the second distillation stage, introducing the starting gas mixture which has been freed from the main portion of monovinyl acetylene in the first distillation stage into the second distillation stage at about one third of the height of the column, removing chloroprene saturated with monovinyl acetylene at about two thirds of the height of the column of the second distillation stage and discharging substantially that portion of pure monovinyl acetylene which merely flows as expulsion gas in the second distillation stage at the head of the second distillation stage together with the portion of monovinyl acetylene which has been introduced into this second distillation stage in the dissolved state together with the impurities and the chloroprene.

3. The process of claim 1 wherein an excess amount of starting free monovinyl acetylene is present as a result of the first distillation stage, said excess being recycled to the reaction with hydrogen chloride in aqueous cuprous chloride solution.

4. The process of claim 2 wherein the monovinyl acetylene leaving at the head of the second distillation stage is divided in a manner such that the quantity of expulsion gas flowing in the second distillation stage returns to the sump of this second distillation stage, while the quantity of monovinyl acetylene which has been introduced into this second distillation stage in the dissolved state together with the impurities and the chloroprene is branched off and recycled to the reaction in the reactor, after being combined with the head product of the first distillation stage.

5. The process of claim 1 wherein the mixture of chloroprene, monovinyl acetylene and inert gas remaining after the monovinyl acetylene expelling step by the oxygen-free inert gas in the third distillation stage is washed with chloroprene, and the remaining mixture of chloroprene and monovinyl acetylene is then returned to the second distillation stage.

6. The process of claim 1 wherein the liquid starting mixture taken off from the sump of the first distillation stage and consisting of chloroprene and impurities still saturated with dissolved monovinyl acetylene is dried before being introduced into the second distillation stage.

7. The process of claim 2 wherein the second distillation stage is divided into two parts, the first part extending to a position below the outlet for the chloroprene saturated with monovinyl acetylene, and said chloroprene being removed from the sump of the second part of the distillation column.

References Cited in the file of this patent

UNITED STATES PATENTS

| | | |
|---|---|---|
| 1,950,441 | Carothers et al. | Mar. 13, 1934 |
| 2,207,784 | Carter | July 16, 1940 |

FOREIGN PATENTS

| | | |
|---|---|---|
| 569,097 | Great Britain | May 4, 1945 |

UNITED STATES PATENT OFFICE
CERTIFICATE OF CORRECTION

Patent No. 2,984,690            May 16, 1961

Kurt Sennewald et al.

It is hereby certified that error appears in the above numbered patent requiring correction and that the said Letters Patent should read as corrected below.

Column 4, line 75, for "1:1½" read -- 1:½ --; column 6, line 69, for "147" read -- 148 --.

Signed and sealed this 24th day of October 1961.

(SEAL)
Attest:

ERNEST W. SWIDER
Attesting Officer

DAVID L. LADD
Commissioner of Patents

USCOMM-DC